Figure 1:
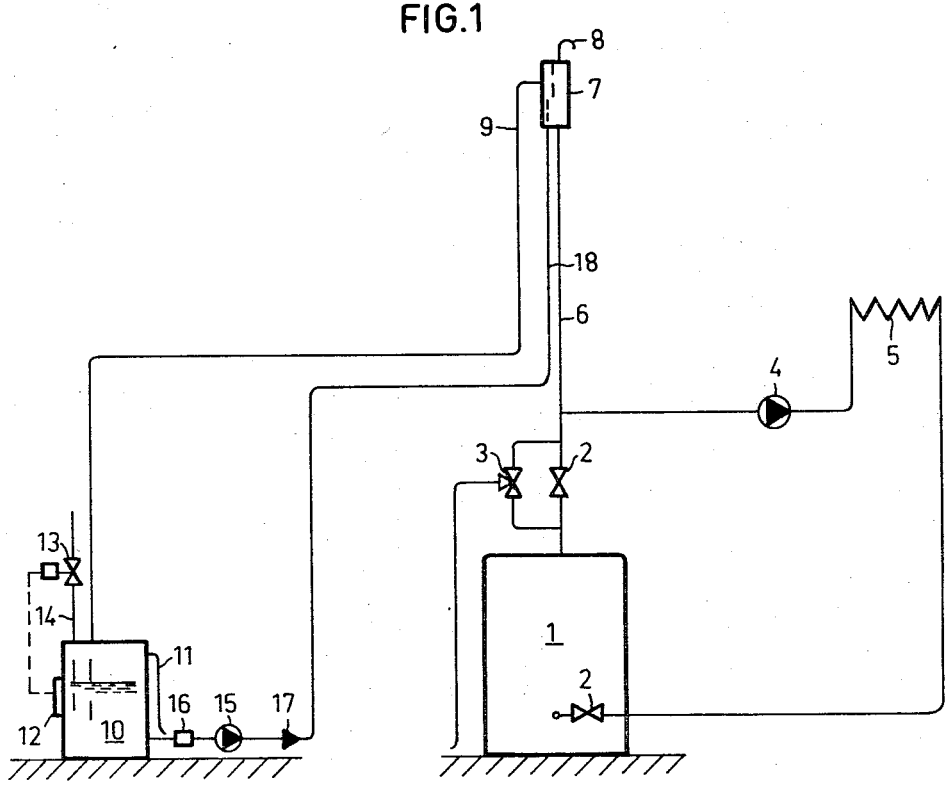

United States Patent

[11] 3,554,441

| [72] | Inventors | Karl Gunnar Malmstrom<br>Privatvägen 1, 130 20 Saltsjö-Boo, and<br>Roy Henning Donald Carlson, Eklidsvagen<br>11,146 00 Tullinge, Sweden |
|---|---|---|
| [21] | Appl. No. | 782,042 |
| [22] | Filed | Dec. 9, 1968 |
| [45] | Patented | Jan. 12, 1971 |
| [32] | Priority | Dec. 22, 1967 |
| [33] | | Sweden |
| [31] | | No. 17,654/1967 |

[54] ARRANGEMENT IN CENTRAL HEATING SYSTEMS
6 Claims, 2 Drawing Figs.

[52] U.S. Cl. .................................................. 237/56, 237/66
[51] Int. Cl. ..................................................... F24d 3/10

[50] Field of Search .......................................... 237/56, 66, 57, 59, 8

[56] References Cited
UNITED STATES PATENTS
352,908        Barker ........................... 237/56
FOREIGN PATENTS
177,431   12/1961  Sweden ....................... 237/66

*Primary Examiner*—Edward J. Michael
*Attorney*—Young and Thompson

ABSTRACT: A central heating system comprises a vessel placed on a level above the heating circuit. Said vessel has an overflow pipe belonging to a circulating circuit by means of which liquid is continuously fed to the vessel from a lower container to maintain a constant level in the vessel. The lower container communicates with the atmosphere, the volume changes in the heating circuit being taken up in said container.

PATENTED JAN 12 1971    3,554,441

KARL GUNNAR MALMSTRÖM
ROY HENNING DONALD CARLSON
INVENTORS

BY Young + Thompson
ATTYS.

ARRANGEMENT IN CENTRAL HEATING SYSTEMS

The present invention is concerned with an arrangement in central heating systems or the like which include a safety pipe connected to a container which is placed on a level above the heating circuit. Previously applied expansion systems in heating systems of the above type can be divided into two groups, called open and closed systems respectively. In the case of the open system the safety pipe is possibly connected with a downcomer via an expansion vessel which is positioned above the highest situated heat emitting body in the heating system, the downcomer conducting away the water from the heating system when the water expands as a result of the increase in temperature in said system. Water losses are compensated for by charging fresh, cold water to the heating system.

The closed system includes an expansion vessel which is pressurized by means of a cushion of for example gas in the form of steam, air, nitrogen gas, etc. This system is provided with safety valves and must be superintended. When the water expands water poor in oxygen flows out of the system through one or more safety valves, and is replaced with fresh, cold water rich in oxygen, pumped into the system.

Both of these systems are associated with disadvantages, one such disadvantage being the risk of corrosion caused by the fresh cold water fed to the system. The liquid is usually pumped intermittently into the system, and the pump is normally controlled by impulses from mechanical or electrical impulse generators which gauge the level of the liquid. The impulse generators, however, do not always function with the desired efficiency and on occasions break down completely causing interruptions in the operation of the system. The open system presents an added disadvantage in that it is liable to freeze in cold weather, whereupon lumps of ice can form which give rise to unintended pressure sources.

The object of the present invention is to eliminate the disadvantages associated with previously known systems.

The invention is mainly characterized in that the vessel situated on a level above the heating circuit is provided with an overflow pipe which forms part of a circulation circuit by means of which liquid is constantly fed to the vessel from a container located on a lower level to maintain a constant liquid level in the vessel. The arrangement of the invention enables a constant circulation to be maintained in said circulation circuit by causing water to overflow from the vessel and feeding said vessel constantly with liquid from the lower container, thus maintaining the desired level of liquid in the expansion system of the heating circuit. This is effected without the assistance of impulses from level gauging indicators etc. The constant flow of liquid into the vessel also reduces the risk of the liquid therein freezing. Consequently, in practice the upper vessel may be in the form of a simple pipe which communicates via the overflow pipe with a simple container placed in the boiler room, for example, and serving as an expansion vessel.

The invention will now be described with reference to the accompanying drawing, in conjunction with which further characteristic features thereof will be disclosed.

Figure 2:
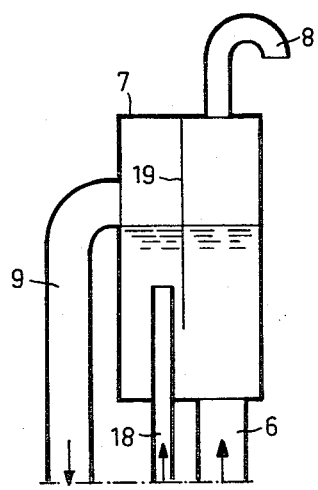

In the drawing, FIG. 1 shows in a diagrammatic form an arrangement according to the present invention and FIG. 2 shows on an enlarged scale a vessel provided with a overflow line.

The reference numeral 1 in the drawing indentifies a boiler provided with cutoff valves 2 and a changeover valve 3. A pump 4 pumps water around the heating circuit 5. The changes in volume of the liquid are transferred via a safety pipe 6 to a vessel 7 which is situated on a higher plane than the heating circuit. The vessel 7 is connected to atmosphere by a steam pipe 8. The level of liquid in the vessel 7 is held constant by an overflow of liquid in an overflow pipe 9 which conducts the liquid to a container 10 situated below the vessel 7. The container 10 is provided with a spillway 11 and a level regulator 12 which in turn is provided with a valve 13 through which fresh water is supplied to the system via a line 14. A filter or screen is provided to capture any solid impurities in the liquid. A circulation pump 15 constantly pumps the water via a non-return valve 17 and a line 18 up to and into the upper vessel 7 to form a closed circuit is which the level of liquid in the vessel 7 is held constant. As the temperature in the hot water system rises, the liquid overflows from the vessel 7 and is conducted to the lower container 10 which serves as an expansion vessel partly as a result of the expanding volume of the water in the heating circuit and partly as a result of the continuous introduction of circulation liquid via the pump 15.

As the temperature in the heating circuit falls the water contracts and is only supplied to the container 10 as a result of overflow from the vessel 7 caused by the addition of water circulated by the pump 15.

The vessel 7 together with pipes 6, 8, 9 and 18 are shown more clearly in FIG. 2. The vessel 7 is also provided with a partition wall 19 which is extended down under the liquid level in the vessel to isolate the mouths of the lines 9, 18 from atmosphere and thus prevent the continuously circulating liquid from, inter alia, absorbing oxygen from the surroundings.

Another contributory factor in this respect is that the inlet of circuit members 9, 10, 18 to the vessel 7 is situated at a higher level than the inlet with which the safety pipe 6 from the heat emitting circuit opens into the vessel 7.

As will be seen from FIG. 1 the overflow pipe 9 discharges into the expansion vessel or container 10 below the level of the liquid therein, whereby the amount of oxygen taken up by the circulating liquid from the air present in the circuit can be kept low.

An arrangement according to the invention presents the advantages which are obtained by an open system, and fulfills the requirements of reliable operation and the possibility of free expansion of circulating liquid. As is shown in the drawing the expansion vessel or container 10 can be placed on the same level as the boiler and possibly also adjacent the same, thereby eliminating the risk of freezing, avoiding damage due to leakage besides facilitating servicing and repair work. Additionally, it should be emphasized that in contradistinction to prior art expansion vessels, the constant liquid level maintained in the vessel or pipe 7 enables a relatively high pressure to be sustained in the system, making temperatures in excess of 100° C. possible. Thus, the static pressure head which is obtained in the heating circuit or hot water system by means of the circulation pump and overflow line from vessel 7 replaces such safety valves necessary in prior art expansion systems in hot water systems. The heating system still functions as an open system, however, despite the high pressure which can be produced in this way.

The invention is not restricted to the described and illustrated embodiment but can be modified within the scope of the following claims.

We claim:

1. In a central heating system having a heating circuit, and a vessel disposed on a level above the heating circuit; the improvement comprising a container separate from the heating circuit and disposed at a level below the vessel, means for continuously feeding liquid from said container to said vessel, and constant level overflow means for returning liquid from said vessel to said container.

2. A system as claimed in claim 1, said container communicating with the atmosphere.

3. A system as claimed in claim 2, and a liquid level regulator for said container, and means responsive to said regulator for adding liquid to said container when the level of liquid in the container falls below a predetermined height.

4. A system as claimed in claim 1, the inlet of liquid from said container into said vessel being at a higher level than the inlet of liquid from the heating circuit into said vessel.

5. A system as claimed in claim 1, and a partition wall that subdivides said vessel and that extends below the liquid level in the vessel, said vessel communicating with the atmosphere on the side of said partition wall which is opposite the side on which said container communicates with the vessel.

6. A system as claimed in claim 1, said overflow means communicating with said container below the level of liquid in said container.